5935X C. F. FISHER.
Alcohol Still.
Patented Apr 24, 1830.
NO PRINTED COPY OF SPECIFICATION IN OFFICE.
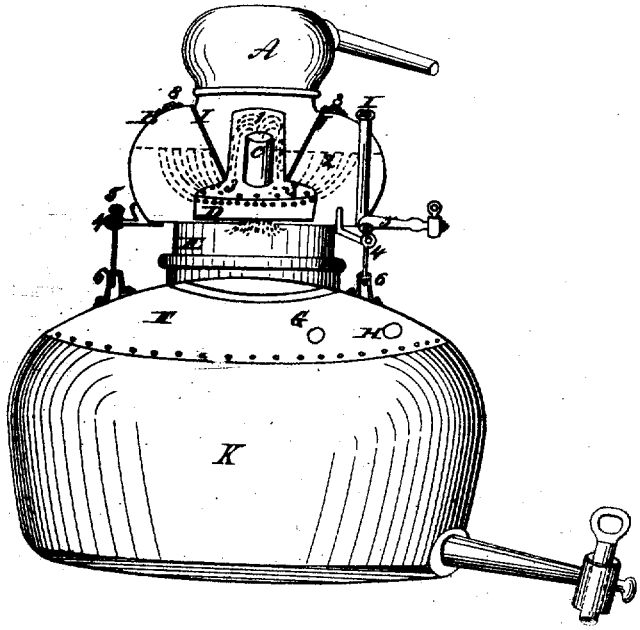

4/24/1830 5935X

Charles W. Risher.
Letters Patent. (Patented April 24th 1830.)
The Schedule <u>refered</u> to in these Letters Patent & making
part of the same, containing a description in the words of
the said Charles W. Risher himself of his improvement in
the Art of Distilling.

The manner of using the C. D. Still; to charge the
double still with a tin or copper pump at (letter I) with
12 to 14 gallons of singlings; next, then charge the lower
still at letter H with the beer, stirring at the hole G, until
you see that the beer begins to boil, then shut both holes tigh
then the vapour passes thro C the steam pipe & D the separa
tor, & in about 17 minutes the still will commence to run
& the liquor (appears) at the end of the worm, (<u>while</u> the
liquor is running the fire must be kept even) & the
door shut at the furnace, until the liquor is off, afterwards
you may run the still faster by giving a little vent or
more fire, (the stiller will soon learn to regulate the
fire.) after the liquor is ~~run~~ off you leave 12 or 14 gallons
singlings run off, which is to be put into the doubling still
then you let the water out of the small still at the cock
& you tap off the slop in the lower still: fill it again as
before & the doubling still with 12 or 14 gallons of sin
glings as above stated &c Should any beer from the
still below get into the still above, you must leave off
of the small still 3, 4, or 5 gallons, at the cock of the small
still & the process goes on the same <u>same</u>, as if no beer had
got in the small still. after the small still is run off.
it would then be proper to take off the cap of the small
still and clean it.
Chymical Double Still. The superiority of the Chymical Double Still over all others, is, that it saves fuel & labour, & produces more liquor from the same quantity of grain, than any other mode of distilling yet known. By all the modes of distilling now known, the steam or vapour is conducted thro a pipe, or operates otherwise in a body or current upon the doubling, in consequence of which the doubling is thrown apart by a single volley of steam which carries with it its watery particles & weakens the spirits.

The Proprietor claims the Invention of placing the Doubling Still, immediately over the singling still [illegible] of the separating the vapour in such a manner as to prevent the liquor that is to be distilled from being thrown apart or from boiling in large vollies; by this invention the watery parts are prevented from getting over with the spirits, unless the large or singling still is overheated; if the fire be kept regular the small still boils imperceptibly & the evaporation of the spirits goes on & leaves the watery particles behind until the volatile part of the spirits is gone over.

Witnesses.
Jno. Evans.
H. Y. Haypraker [illegible]

Charles F. Fisher (611 words)

Received and Recorded

1841. & Exd. W.G.